US006630193B2

(12) United States Patent
Aoto et al.

(10) Patent No.: US 6,630,193 B2
(45) Date of Patent: Oct. 7, 2003

(54) GERMINATED BROWN RICE

(75) Inventors: Hiromichi Aoto, Yokohama (JP);
Tomomi Sugino, Yokohama (JP);
Hiroto Shinmura, Yokohana (JP); Aya Mizukuchi, Yokohama (JP); Mitsuo Kise, Yokohama (JP); Sachiyuki Teramoto, Yokohama (JP); Sachiko Someya, Yokohama (JP); Keiko Tsuchiya, Yokohama (JP); Kenichi Ishiwata, Yokohama (JP)

(73) Assignee: Fancl Corporation, Kanagawa-ken (JP)

( * ) Notice: Subject to any disclaimer, the term of this patent is extended or adjusted under 35 U.S.C. 154(b) by 242 days.

(21) Appl. No.: 09/872,573

(22) Filed: Jun. 1, 2001

(65) Prior Publication Data

US 2002/0031596 A1 Mar. 14, 2002

(30) Foreign Application Priority Data

Jun. 9, 2000 (JP) ........................ 2000-173795
Sep. 14, 2000 (JP) ........................ 2000-279469
Dec. 1, 2000 (JP) ........................ 2000-366465

(51) Int. Cl.$^7$ .............................. A23B 9/08; A23L 1/36
(52) U.S. Cl. ................. 426/627; 426/618; 426/44; 426/459; 426/460; 426/461; 426/465
(58) Field of Search .................. 426/618, 455, 426/456, 44, 460, 461, 459, 465, 627

(56) References Cited

U.S. PATENT DOCUMENTS 4,276,321 A  *  6/1981  Nagatani ................ 426/618
5,275,836 A  *  1/1994  Lewis et al. ............. 426/627
5,316,783 A  *  5/1994  Kratochvil et al. ........ 426/627
5,738,892 A     4/1998  Takaoka
5,862,627 A  *  1/1999  Jang .................... 47/58.1 R
6,060,098 A  *  5/2000  Takaoka ................. 426/237
6,210,734 B1    4/2001  Jun
6,416,802 B1    7/2002  Lin et al.
6,511,697 B1 *  1/2003  Yamanaka .............. 426/618

FOREIGN PATENT DOCUMENTS

JP    52-18848     2/1977
JP    60-199356   10/1985
JP    61-285949   12/1986

OTHER PUBLICATIONS

Juliano, B. O. 1985. Rice: Chemistry and Technology. The American Association of Cerial Chemists, Inc., St. Paul, Minnesot pp. 60–63, 222–229, 303–309.*

* cited by examiner

*Primary Examiner*—Carolyn Paden
(74) *Attorney, Agent, or Firm*—Knobbe, Martens, Olson & Bear LLP

(57) ABSTRACT

The invention relates to germinated brown rice which can be easily and deliciously boiled even by a household rice cooker without impairing its original nutritive value, and has excellent mouth feel and shelf stability. The germinated brown rice can be provided by subjecting germinated brown rice to a heat-moisture treatment and drying the treated germinated brown rice to a water content of 10 to 18% by mass and a degree of gelatinization of 5 to 50%.

17 Claims, No Drawings

GERMINATED BROWN RICE

BACKGROUND OF THE INVENTION

1. Field of the Invention

The present invention relates to germinated brown rice which can be easily boiled by a household rice cooker and is high in shelf-life stability. The present invention also relates to a process for treating brown rice, by which occurrence of cracked rice kernel or broken rice after drying is reduced.

2. Description of the Background Art

Germinated brown rice is evaluated as functional food because it is good in digestion and uptake and contains nutrient components such as γ-aminobutyric acid and ferulic acid in plenty compared with ordinary brown rice. However, cooked germinated brown rice is rough in mouth feel and unpleasant in flavor though the germinated brown rice may be cooked by an ordinary household rice cooker. Germinated brown rice subjected to, for example, steaming for at least 20 minutes, cooling, packaging as it is and heat sterilization, in order to facilitate boiling is broken or cracked in rice kernel because it contains water in plenty and moreover has been subjected to the heat treatment twice. Therefore, such germinated brown rice involves such problems that its appearance after boiling is impaired, it gives stink of bran and sticky feel upon eating and the cooked brown rice becomes quickly hard in mouth feel when it cools. So the use of the germinated brown rice is not always popular. In order to improve its mouth feel, it is possible to apply a process of cooking brown rice by an existing pressure rice cooker, which is performed as a method of cooking the brown rice, to the germinated brown rice. However, such a process involves a demerit of destroying rich nutrients of the germinated brown rice, such as vitamin B.

The germinated brown rice itself absorbs water in plenty in a germination process thereof, and so its shelf-life stability becomes poor and a problem arises from the viewpoint of distribution. Therefore, it has been necessary to cope with such a problem by, for example, vacuum packaging a small amount of heat-treated germinated brown rice, such as an amount of one meal, and further heat sterilizing it. When the germinated brown rice is vacuum packaged, however, a problem of handling arises when it is used in processed food of the germinated brown rice or for business purpose. Therefore, such treated germinated brown rice involves a problem that it is lacking in general-purpose properties from the viewpoints of processability and distribution property.

It is considered to dry germinated brown rice as a means for enhancing the shelf-life stability and distribution property of the germinated brown rice. However, the germinated brown rice, in which water has been contained in plenty in the germination process, involves a problem that cracking or breaking of rice kernel is often caused and its yield after the drying is lowered. On the other hand, it is also conducted to slow the drying speed to prevent the occurrence of cracked rice kernel and broken rice. However, it takes a considerably long time to dry the germinated brown rice to an ideal water content for improving shelf-life stability. There has thus been a demand for an effective means for industrially drying germinated brown rice.

SUMMARY OF THE INVENTION

It is a first object of the present invention to provide germinated brown rice which can be easily and deliciously cooked even by a household rice cooker without impairing its original nutritive value, and at the same time, is not accompanied by marked deterioration of mouth feel even when cooked germinated brown rice cools and moreover has excellent shelf-life stability.

A second object of the present invention is to provide germinated brown rice which can be cooked easily and has excellent shelf-life stability and is reduced in occurrence of cracked rice kernel or broken rice.

The present inventors have carried out an extensive investigation. As a result, it has been found that the first object can be achieved by controlling the water content, degree of gelatinization and preferably water absorption upon immersion in water of germinated brown rice. It has also been found that the second object can be achieved by controlling the water content and degree of gelatinization of germinated brown rice by subjecting the germinated brown rice to a steaming treatment or heat-moisture treatment and drying the treated germinated brown rice.

According to the present invention, there is thus provided germinated brown rice the water content of which is 10 to 18% by mass and the degree of gelatinization of which is 5 to 50%.

The germinated brown rice according to the present invention may preferably have a water absorption rate of 110 to 140% upon immersion in water.

According to the present invention, there is also provided germinated brown rice obtained by subjecting germinated brown rice to a heat-moisture treatment and drying the treated germinated brown rice to a water content of 10 to 18% by mass and a degree of gelatinization of 5 to 50%.

According to the present invention, there is further provided a process for treating germinated brown rice, which comprises removing water attached to the surface of the germinated brown rice to an extent that the germinated brown rice becomes an almost single kernel state, subjecting the germinated brown rice of the almost single kernel state to a heat-moisture treatment and then drying the treated germinated brown rice to a water content of 10 to 18% by mass and a degree of gelatinization of 5 to 50%.

According to the present invention, there can be provided germinated brown rice which can be cooked easily and has excellent mouth feel and shelf-life stability. According to the present invention, there can also be provided a treating method of germinated brown rice which can be cooked easily and has excellent shelf-life stability and is reduced in occurrence of cracked rice kernel or broken rice.

DETAILED DESCRIPTION OF THE PREFERRED EMBODIMENTS

The water content in the germinated brown rice as referred to in the present invention may be generally 10 to 18% by mass, preferably 12 to 18% by mass, more preferably 13 to 16% by mass. If the water content is lower than 10% by mass, each kernel of such germinated brown rice tends to cause cracking or breaking, and so such germinated brown rice involves a problem that the taste of cooked germinated brown rice is impaired. If the water content exceeds 18% by mass on the other hand, mold, bacteria and the like are easy to gather, and so a problem arises from the viewpoint of shelf-life stability.

The degree of gelatinization as referred to in the present invention means a value determined in accordance with the β-amylase.pllulanase method (BAP method). The BAP method is an excellent method for distinguishing gelatinized starch from raw starch or retrograded starch. The degree of gelatinization of the germinated brown rice according to the present invention may be 5 to 50%, preferably 5 to 30%, more preferably 10 to 20%. If the degree of gelatinization of the germinated brown rice is lower than 5%, such germinated brown rice involves problems that it is rough in mouth feel when boiled together with polished rice and that an incidence of cracked rice kernel or broken rice becomes high upon its drying. If the degree of gelatinization exceeds 50% on the other hand, blocking among rice kernels occurs, and so handling in the drying process becomes hard, and drying efficiency also becomes poor. In addition, when the germinated brown rice is blended with polished rice to boil the blend, only the germinated brown rice becomes too soft, and so balance of mouth feel after the cooking becomes poor.

The degree of gelatinization can be controlled to the desired value by, for example, suitably adjusting conditions of the heat-moisture treatment and drying in the production of the germinated brown rice. For example, when drying speed is made mild like solar drying to subject the germinated brown rice to no heat treatment, the degree of gelatinization amounts to about 5 to 15%. When the germinated brown rice is steamed at 98° C. for about 5 to 20 minutes, or heated and dried at 60° C. for about 40 minutes or at 80° C. for about 25 minutes, the degree of gelatinization amounts to about 10 to 50%.

The water absorption upon immersion in water as referred to in the present invention is found by using water of 25° C., immersing a germinated brown rice sample at room temperature for 30 minutes in water and dividing the weight of the germinated brown rice sample after immersion by the weight of the germinated brown rice sample before the immersion and is expressed by %. In the present invention, the water absorption rate upon immersion is preferably 110 to 140%, more preferably 112 to 138%. If the water absorption rate is lower than 110%, the boiled germinated brown rice is half-done, and rice kernels after cooled become hard and have a dry mouth feel. If the water absorption rate exceeds 140% on the other hand, such germinated brown rice looses its shape when it is cooked, and the germinated brown rice tends to have a sticky feel. Therefore, not only a mouth feel, but also its appearance is spoiled. The water absorption upon immersion is also related to the water content in the germinated brown rice. Germinated brown rice having low water content is high in water absorption, and germinated brown rice having high water content is low in water absorption. However, the water absorption upon immersion is greatly affected by not only water content, but also peeling off and damage of the surface of germinated brown rice. Accordingly, the water absorption rate can be controlled by controlling the water content and conducting peeling. The more the surface of germinated brown rice is peeled, the more its water absorption rate is made high.

The water content, degree of gelatinization and water absorption upon immersion can be controlled to respective desired values by determining conditions of peeling, heat-moisture treatment and drying by conducting experiments properly.

The germinated brown rice according to the present invention can be prepared in accordance with, for example, the following process.

Brown rice is immersed in a germination tank (tank for germination) as it is or after a part of the brown rice is peeled off by a rice whitening machine, rice washer or the like to cause peeling off and damage of its surface, and the thus-obtained brown rice is washed 2 to 4 times with water and then dewatered. The peeling may be conducted after the immersion. The brown rice may be peeled to preferably 95 to 99.8% by mass, more preferably 97 to 99% by mass. By such a treatment, foreign matter and microorganisms attached to the surface of the raw brown rice can be removed, and the amount of water required of rice washing can also be reduced. As described above, the degree of peeling affects the water absorption upon immersion and percentage germination. Therefore, the degree of the peeling can preferably be determined taking this point into consideration. The water used in the rice washing may be any of tap water, distilled water, well water, acid water, electrolytic brine, water in which ozone has been dissolved, etc. so far as it is water usable for food.

With respect to conditions of immersion in the germination tank, there is a method that the brown rice is immersed in warm water of generally 20 to 50° C. until the brown rice is germinated, or immersed for, for example, about 3 to 5 hours, dewatering is conducted thereafter, and water spraying is intermittently conducted to germinate the brown rice for the predetermined period of time under high-humidity conditions. As examples of the warm water used, may be mentioned the water described in the rice washing process, and any water may be used so far as it is water usable for food.

The germination may be conducted to a state that a swelling, protuberance or plumule of about 0.5 to 2.0 mm from an embryo can be recognized. After the germination, the germinated brown rice is subjected to a heat treatment in order to stop germination. In order to stop germination, the germinated brown rice may be steamed, or treated at a proper temperature or dried by a suitable method such as the use of hot air or microwaves or cooling.

The germinated brown rice is discharged from the germination tank to transfer it to the next drying process. Before drying, it is preferred that water attached to the germinated brown rice be removed to an extent that the germinated brown rice becomes an almost single kernel state, and the germinated brown rice be subjected to a heat-moisture treatment and then dried. The single kernel state means a state that most of kernels of the germinated brown rice are not bonded to one another with water attached to the surfaces thereof. By this state, handling upon the heat-moisture treatment and drying process is conducted with ease, and so attachment of kernels to one another or a wall surface of an apparatus, unevenness of degree of gelatinization and drying irregularity can be prevented, and drying efficiency can also be improved. The removal of water attached to the surfaces can be conducted by, for example, putting the germinated brown rice discharged on a draining conveyer. At this time, the water attached to the surfaces can be efficiently removed by vibrating the conveyer or conducting ventilation. It is more preferred that agitation be conducted by a rotating blade having a agitating function, screw or the like as needed.

Specifically, the heat-moisture treatment is a process in which a subject is heated by using, as a heating medium, saturated steam or hot water in a high-humidity atmosphere, for example, an atmosphere of at least 60% humidity. In this case, either a heating method in which the subject to be heated is brought into direct contact with the heating medium or a heating method in which the subject is brought into indirect contact with the heating medium like an indirect heating system, for example, in an atmosphere of at least 60% humidity may be performed. With respect to specific conditions, the treatment may be conducted, for example, at a steam temperature of 98 to 180° C. for 3 seconds to 30 minutes. If the steam temperature is lower than 98° C., the time required for the desired gelatinization is elongated. Therefore, such a low steam temperature is not very preferable when industrial mass production is performed. If the steam temperature exceeds 180° C. on the other hand, a problem that the gelatinization is allowed to too progress is caused, and so the immersion time is limited, and the mouth feed of boiled germinated brown rice is deteriorated when the immersion is conducted for a long period of time. If the treatment time is shorter than 3 seconds, irregularities may occur on the degree of gelatinization of rice kernels, and the control in the practical process is also difficult. If the treatment time exceeds 30 minutes on the other hand, the gelatinization of the germinated brown rice is allowed to too progress, and the swelling of rice kernels occurs. Therefore, kernels of the resulting germinated brown rice are easy to be collapsed when the germinated brown rice is blended with polished rice and immersed for a long period of time.

A steaming treatment of rice, which is used in boiled rice production, fermentation industry and the like, may be mentioned as an example of another method than the above-described method. Specifically, for example, brown rice subjected to the germinating treatment is treated with steam for 3 seconds to 30 minutes, preferably 10 seconds to 30 minutes under conditions of 0.1 to 7.0 kg/cm$^2$, preferably 0.1 to 2.0 kg/cm$^2$. If the steam pressure is lower than 0.1 kg/cm$^2$, the preventive effect on the occurrence of cracked rice kernel or broken rice is lessened. The same shall apply to the treatment time shorter than 3 seconds. If the treatment time is too long on the other hand, the gelatinization is allowed to too progress, and so the resulting germinated brown rice tends to deteriorate the mouth feel when boiled together with polished rice, easily cause blocking between kernels and deteriorate handling in the drying process. On the other hand, even if the steam pressure exceeds 7.0 kg/cm$^2$, the preventive effect on the occurrence of cracked rice kernel or broken rice is achieved. However, too high pressure involves a problem of safety.

The drying may be conducted by any of convective (hot air) drying method, radiation drying method, indirect drying method, evenly heating method by electromagnetic waves or the like, vacuum drying method, lyophilization method, etc.

When tempering is conducted before the desired water content is reached in the drying process, beautiful finish can be achieved, and the occurrence of broken rice can be reduced to a greater extent.

When the raw brown rice is peeled in advance, the drying time can be shortened, and it is possible to soften hard pericarp and lessen emission of offensive smell. When a part of surface of the germinated brown rice is whitened to peel off or damage it, it is also possible to more soften hard epidermis and lessen emission of offensive smell.

The germinated brown rice according to the present invention may be used for food by boiling it either singly or in combination with brown rice or polished rice, or as a raw material of rice confectionery such as rice crackers, and processed foods such as bread and behon. As needed, intensification of nutrition may be conducted with functional components such as vitamins, minerals, γ-orizanol, tocotrienol and ferulic acid by a proper treatment such as water absorption by immersion or coating.

The present invention will hereinafter be described in detail by the following Examples.

EXAMPLE 1

Raw brown rice (Hinohikari, trade name; from Kagawa) was washed by a rice washer and immersed for 24 hours in water controlled to a constant temperature of 30° C. to be germinated. Thereafter, the thus-treated brown rice was steamed at 98° C. for 2 minutes and then subjected to fluidized bed drying at 80° C. for 20 minutes to obtain germinated brown rice.

EXAMPLE 2

Raw brown rice (Koshihikari, trade name; from Nagano) was washed by a rice washer and immersed for 24 hours in water controlled to a constant temperature of 30° C. to be germinated. Thereafter, the thus-treated brown rice was steamed at 98° C. for 20 minutes, cooled and then subjected to fluidized bed drying at 80° C. for 20 minutes to obtain germinated brown rice.

EXAMPLE 3

Raw brown rice (Koshihikari, trade name; from Niigate) milled so as to give a milling yield of 98.5% was immersed for 24 hours in water controlled to a constant temperature of 30° C. to be germinated. Thereafter, the thus-treated brown rice was steamed at 98° C. for 2 minutes and then subjected to fluidized bed drying at 80° C. for 20 minutes to obtain germinated brown rice.

EXAMPLE 4

Raw brown rice (Akitakomachi, trade name; from Akita) milled so as to give a milling yield of 99.9% was washed by a rice washer and immersed for 24 hours in water controlled to a constant temperature of 30° C. to be germinated. Thereafter, the thus-treated brown rice was subjected to fluidized bed drying at 80° C. for 20 minutes to obtain germinated brown rice.

COMPARATIVE EXAMPLE 1

Raw brown rice was treated in the same manner as in Example 1 except that the water content of germinated brown rice after the fluidized bed drying was controlled to 18.7% by mass to obtain germinated brown rice.

COMPARATIVE EXAMPLE 2

Raw brown rice (Koshihikari, trade name; from Nagano) was washed by a rice washer and immersed for 24 hours in water controlled to a constant temperature of 30° C. to be germinated. Thereafter, the thus-treated brown rice was steamed at 98° C. for 20 minutes and cooled to obtain germinated brown rice having a water content of 36.9% by mass.

COMPARATIVE EXAMPLE 3

Raw brown rice (Koshihikari, trade name; from Nagano) was washed by a rice washer and immersed for 24 hours in water controlled to a constant temperature of 30° C. to be germinated. Thereafter, the thus-treated brown rice was steamed at 98° C. for 20 minutes, cooled and then subjected to fluidized bed drying at 80° C. for 45 minutes to obtain germinated brown rice the water content of which was controlled to 9.5% by mass.

COMPARATIVE EXAMPLE 4

Raw brown rice (Hinohikari, trade name; from Kagawa) milled so as to give a milling yield of 94% was immersed for 24 hours in water controlled to a constant temperature of 30° C. to be germinated. Thereafter, the thus-treated brown rice was steamed at 98° C. for 30 minutes, cooled and then subjected to fluidized bed drying at 80° C. for 20 minutes to obtain germinated brown rice the water content of which was controlled to 14% by mass.

EXAMPLE 5

Raw brown rice (Koshihikari, trade name; from Nagano) milled so as to give a milling yield of 94% was washed by a rice washer and immersed for 24 hours in water controlled to a constant temperature of 30° C. to be germinated. Thereafter, the thus-treated brown rice was steamed at 98° C. for 20 minutes, cooled and then subjected to fluidized bed drying at 80° C. for 40 minutes to obtain germinated brown rice the water content of which was controlled to 10% by mass.

EXAMPLE 6

Raw brown rice (Koshihikari, trade name; from Nagano) was washed by a rice washer and immersed for 24 hours in water controlled to a constant temperature of 30° C. to be germinated. Thereafter, the thus-treated brown rice was subjected to fluidized bed drying at 80° C. for 13 minutes to obtain germinated brown rice the water content of which was controlled to 18% by mass.

The water contents, water absorption upon immersion in water, degree of gelatinization and fatty acid content of the germinated brown rices obtained in Examples 1 to 6 and Comparative Examples 1 to 4, and the results of a panel test (mouth feel: roughness, glutinousness, odor) and a shelf-life stability test are shown collectively in Table 1. High fatty acid content causes offensive smell and deterioration of the taste. Incidentally, the water absorption upon immersion in water was found by immersing 50 g of each sample of the germinated brown rices obtained in Examples 1 to 6 and Comparative Examples 1 to 4 at room temperature for 30 minutes in 100 ml of water of 25° C. and dividing the weight of the sample after immersion by the weight of the sample before the immersion and was expressed by %. The degree of gelatinization was determined by using a germinated brown rice sample after 1 week from the production of the germinated brown rice as a subject in accordance with the β-amylase.pllulanase method (BAP method). The water content and fatty acid content were analyzed by a method using near infrared rays.

The shelf-life stability was evaluated by heat sterilizing a sample, placing the sample into a polyvinylchloride bag with a zipper and leaving the sample to stand for 1 month. Whether the appearance of the sample was changed or not and offensive smell was emitted or not was confirmed, and the sample was ranked as ○ where no problem arose (good), or × where a problem arose.

The panel test was conducted by having 9 panelists (20 to 50 years of old) eat a boiled germinated brown rice sample right after the boiling and a cooled sample. The evaluation was made in the following manner. Each sample of the germinated brown rices obtained in Examples 1 to 6 and Comparative Examples 1 to 4 was cooked by an electric rice cooker in immersion time of 30 minutes with water 1.5 times as much as the sample added thereto.

TABLE 1

| | Water content (% by mass) | Degree of gelatinization | Water absorption upon immersion in water (%) | Fatty acid content | Shelf stability (room temperature, 1 month) | Organoleptic test |
|---|---|---|---|---|---|---|
| Ex. 1 | 16.3 | 12.7 | 124.6 | 27 | ○ (Neither gathered mold nor emitted offensive smell) | ⊙ |
| Ex. 2 | 13.3 | 22.8 | 118.3 | 27 | ○ (Neither gathered mold nor emitted offensive smell) | ○ (Rice kernel had no puffy feel) |
| Ex. 3 | 15.4 | 13.5 | 136.2 | 17 | ○ (Neither gathered mold nor emitted offensive smell) | ⊙ |
| Ex. 4 | 15.0 | 14.0 | 113.7 | 15 | ○ (Neither gathered mold nor emitted offensive smell | Δ (Mouth feel after cooled was rough |
| Comp. Ex. 1 | 18.7 | 14.2 | 125.5 | 29 | X (Emitted fermentation odor) | ○ |
| Comp. Ex. 2 | 36.9 | 24.3 | 108 | 79 | X (Gathered mold after 3 days, and emitted offensive smell) | X (Kernels collapsed and had sticky feel. Had dry mouth feel after cooled, and emitted sugary odor) |
| Comp. Ex. 3 | 9.5 | 25.2 | 145 | 6 | ○ (Neither gathered mold nor emitted foreign odor) | X (Kernels collapsed and had sticky feel. Liable to become hard after cooled) |
| Comp. Ex. 4 | 14.2 | 51 | 120.6 | 15 | ○ (Neither gathered mold nor emitted offensive smell) | X (Kernels has no grain feel and gave no eaten feel. Had sticky feel) |
| Ex. 5 | 10 | 29 | 143 | 9 | ○ (Neither gathered mold nor emitted offensive smell) | Δ (Kernels has no grain feel and gave no eaten feel. Had sticky feel) |
| Ex. 6 | 18 | 11.2 | 108 | 22 | ○ (Neither gathered mold nor emitted offensive smell) | Δ (Hard in kernels, and poor in mouth feel after cooled) |

EXAMPLE 7

Raw brown rice (Hinohikari, trade name; from Kagawa) was immersed for 16 hours in hot water of 30° C. to be germinated. Thereafter, the thus-treated brown rice was steamed at 98° C. for 3 minutes, immediately subjected to fluidized bed drying at 100° C. for 20 minutes, and then cooled for 20 minutes by ventilation to obtain germinated brown rice the water content of which was controlled to 17% by mass.

EXAMPLE 8

Raw brown rice (Koshihikari, trade name; from Kagawa) was immersed for 5 hours in hot water of 30° C., dewatered and then left at rest at room temperature for 10 hours to be germinated. Thereafter, the thus-treated brown rice was steamed at 120° C. for 3 minutes in a ribbon agitated dryer (indirect drying type), and then subjected to fluidized bed drying at 100° C. for 20 minutes to obtain germinated brown rice the water content of which was controlled to 16% by mass.

EXAMPLE 9

Raw brown rice (Koshihikari, trade name; from Nagano) was immersed for 24 hours in hot water of 30° C. to be germinated. Thereafter, the thus-treated brown rice was steamed at 98° C. for 5 minutes, and then subjected to fluidized bed drying at 80° C. for 20 minutes to obtain germinated brown rice the water content of which was controlled to 15% by mass.

EXAMPLE 10

Raw brown rice (Akitakomachi, trade name; from Akita) was immersed for 24 hours in hot water of 30° C. to be germinated. Thereafter, the thus-treated brown rice was treated with superheated steam of 170° C. for 90 seconds, and then dried for 2 hours by ventilation to obtain germinated brown rice the water content of which was controlled to 15% by mass.

EXAMPLE 11

Raw brown rice (Hinohikari, trade name; from Kagawa) was immersed for 24 hours in hot water of 30° C. to be germinated. Thereafter, the thus-treated brown rice was steamed at 98° C. for 30 minutes, cooled and then subjected to fluidized bed drying at 80° C. for 20 minutes to obtain germinated brown rice the water content of which was controlled to 14% by mass.

COMPARATIVE EXAMPLE 5

Raw brown rice (Hinohikari, trade name; from Kagawa) was immersed for 16 hours in hot water of 30° C. to be germinated. Thereafter, the thus-treated brown rice was steamed at 98° C. for 3 minutes, immediately subjected to fluidized bed drying at 100° C. for 20 minutes, and then cooled for 20 minutes by ventilation to obtain germinated brown rice the water content of which was controlled to 20% by mass.

COMPARATIVE EXAMPLE 6

Raw brown rice (Koshihikari, trade name; from Kagawa) was washed by a rice washer and immersed for 24 hours in water controlled to a constant temperature of 30° C. to be germinated. Thereafter, the thus-treated brown rice was steamed at 98° C. for 20 minutes and cooled to obtain germinated brown rice the water content of which was controlled to 37% by mass.

COMPARATIVE EXAMPLE 7

Raw brown rice (Koshihikari, trade name; from Nagano) was washed by a rice washer and immersed for 24 hours in water controlled to a constant temperature of 30° C. to be germinated. Thereafter, the thus-treated brown rice was steamed at 98° C. for 20 minutes, cooled and then subjected to fluidized bed drying at 80° C. for 20 minutes to obtain germinated brown rice the water content of which was controlled to 9.5% by mass.

COMPARATIVE EXAMPLE 8

Raw brown rice (Akitakomachi, trade name; from Akita) was immersed for 24 hours in water controlled to a constant temperature of 30° C. to be germinated. Thereafter, the thus-treated brown rice was steamed at 98° C. for 40 minutes, cooled and then subjected to fluidized bed drying at 80° C. for 30 minutes to obtain germinated brown rice the water content of which was controlled to 10% by mass.

The water contents and degree of gelatinization of the germinated brown rices obtained in Examples 7 to 11 and Comparative Examples 5 to 8, and the results of an panel test (mouth feel: roughness, glutinousness, smell) and a shelf-life stability test are shown collectively in Table 2. The degree of gelatinization was determined by using a germinated brown rice sample after 1 week from the production of the germinated brown rice as a subject in accordance with the β-amylase.pllulanase method (BAP method). The water content was analyzed by a method using near infrared rays.

The shelf-life stability was evaluated by heat sterilizing a sample, placing the sample into a polyvinylchloride bag with a zipper and leaving the sample to stand for 1 month. Whether the appearance of the sample was changed or not and offensive smell was emitted or not was confirmed, and the sample was ranked as ○ where no problem arose (good), or × where a problem arose.

The panel test was conducted by blending each of the germinated brown rice samples with milled rice (Koshihikari, trade name; from Kagawa) in a proportion of 1 to 1 and cooking the resultant blend by an electric rice cooker in immersion time of 30 minutes with water 1.5 times as much as the sample added thereto. The evaluation was made by having 9 panelists (20 to 50 years of old) eat the cooked blend sample right after the boiling to rank the sample in accordance with the following standard:

⊚: Very delicious;

○: Delicious;

Δ: Rather delicious.

×: Unpalatable.

The finish of each germinated brown rice sample after the drying was visually tested to rank it in accordance with the following standard:

TABLE 2

| | Water Content (% by mass) | Degree of gelatinization | Organoleptic test | Shelf stability (room temperature, 1 month) | Finish after drying |
|---|---|---|---|---|---|
| Ex. 7 | 17 | 22.3 | ⊚ | ○ (Neither gathered mold nor emitted offensive smell) | ⊚ |
| Ex. 8 | 16 | 14.4 | ⊚ | ○ (Neither gathered mold nor emitted offensive smell) | ⊚ |
| Ex. 9 | 15 | 11.5 | ○ | ○ (Neither gathered mold nor emitted offensive smell) | ⊚ |

TABLE 2-continued

| | Water Content (% by mass) | Degree of gelatinization | Organoleptic test | Shelf stability (room temperature, 1 month) | Finish after drying |
|---|---|---|---|---|---|
| Ex. 10 | 15 | 34.2 | Δ | ○ (Neither gathered mold nor emitted offensive smell) | ⊚ |
| Ex. 11 | 14 | 42.6 | ○ | ○ (Neither gathered mold nor emitted offensive smell) | ⊚ |
| Comp. Ex. 5 | 20 | 13 | X | X (Gathered mold) | X |
| Comp. Ex. 6 | 37 | 22.8 | ⊚ | ○ (Gathered mold and emitted offensive smell) | ⊚ |
| Comp. Ex. 7 | 9.5 | 24 | ○ | ○ (Neither gathered mold nor emitted offensive smell) | X |
| Comp. Ex. 8 | 10 | 50.6 | X | ○ (Neither gathered mold nor emitted offensive smell) | ○ |

⊚ : The incidence of broken rice was within 10%, and the kernels thereof had high transparency and were glossy;
○ : The incidence of broken rice was within 20%, and the kernels thereof had high transparency;
Δ : The incidence of broken rice was conspicuous, and the kernels thereof were whitish;
X : The incidence of broken rice was very conspicuous, and the kernels thereof were whitish.

What is claimed is:

1. Germinated brown rice the water content of which is 10 to 18% by mass and the degree of gelatinization of which is 5 to 50%.

2. Germinated brown rice obtained by subjecting germinated brown rice to a heat-moisture treatment and drying the treated germinated brown rice to a water content of 10 to 18% by mass and a degree of gelatinization of 5 to 50%.

3. The germinated brown rice according to claim 1 or 2, wherein the water content is 12 to 18% by mass.

4. The germinated brown rice according to claim 1 or 2, wherein the water content is 13 to 16% by mass.

5. The germinated brown rice according to claim 1 or 2, wherein the degree of gelatinization is 5 to 30%.

6. The germinated brown rice according to claim 1 or 2, wherein the degree of gelatinization is 10 to 20%.

7. The germinated brown rice according to claim 1, which has a water absorption rate of 110 to 140% upon immersion in water.

8. The germinated brown rice according to claim 1, which has a water absorption rate of 112 to 138% upon immersion in water.

9. A processed food obtained by using the germinated brown rice according to claim 1 or 2 as a raw material.

10. A process for treating germinated brown rice, which comprises removing water attached to the surface of the germinated brown rice to an extent that the germinated brown rice becomes an almost single kernel state, subjecting the germinated brown rice of the almost single kernel state to a heat-moisture treatment and then drying the treated germinated brown rice to a water content of 10 to 18% by mass and a degree of gelatinization of 5 to 50%.

11. The process according to claim 10, wherein the heat-moisture treatment is a steaming treatment.

12. The process according to claim 11, wherein the steaming treatment is conducted under conditions of a steam pressure of 0.1 to 7 kg/cm$^2$ and treatment time of 3 seconds to 30 minutes.

13. A method for producing an easy-to-cook germinated brown rice, comprising the steps of:
 (a) germinating a brown rice until a plumule grows at a height of approximately 0.5–2 mm;
 (b) terminating the germination of the brown rice by heat;
 (c) removing water existing between the germinated brown rice kernels until the kernels do not adhere to each other with water;
 (d) heating the kernels by steam while maintaining the condition accomplished in step (c) until the kernels have a degree of gelatinization of 5–70%; and
 (e) drying heated kernels until the heated kernels have a water content of 10–18% by mass with a degree of gelatinization of no more than 70%.

14. The method according to claim 13, wherein step (d) is conducted at a temperature of 98–180° C. for 3 seconds to 30 minutes.

15. The method of claim 14, wherein the steam pressure is 0.1–7 kg/cm$^2$.

16. The method according to claim 13, wherein step (e) is conducted by fluidized bed drying.

17. The method according to claim 13, wherein the degree of gelatinization of step (d) is 5–50% and the degree of gelatinization of step (e) is no more than 50%.

* * * * *